Aug. 29, 1967   N. ANTON   3,338,653
MICRO-MINIATURE BETA GAMMA DETECTOR
Original Filed Jan. 3, 1963
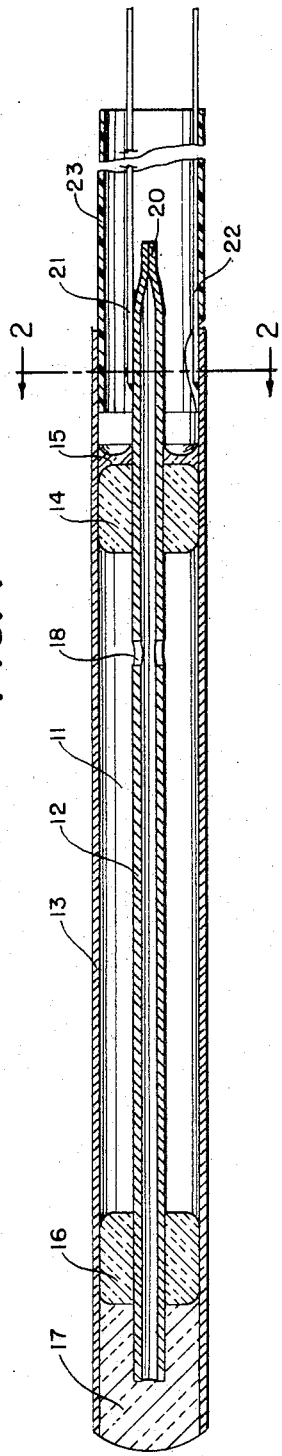
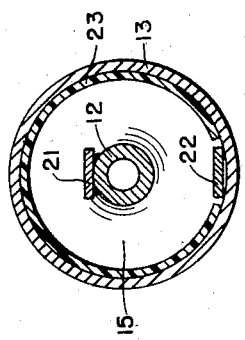
INVENTOR
NICHOLAS ANTON
BY *Hartley & Hartley*
ATTORNEY

3,338,653
MICRO-MINIATURE BETA GAMMA DETECTOR
Nicholas Anton, Brooklyn, N.Y., assignor to Eon Corporation, Brooklyn, N.Y., a corporation of New York
Original application Jan. 3, 1963, Ser. No. 249,296, now Patent No. 3,297,896, dated Jan. 10, 1967. Divided and this application May 2, 1966, Ser. No. 546,845
6 Claims. (Cl. 316—20)

This invention relates to radiation detectors and in particular to a micro-miniature beta gamma ray detector and its method of construction. This application is a divisional application of my copending application Ser. No. 249,296 filed Jan. 3, 1963, now Patent No. 3,297,896 granted Jan. 10, 1967, entiled, "Micro-Miniature Beta Gamma Detector."

The customary radiation detector generally comprises a sealed chamber enclosing a volume of gas which is ionized by incoming radiation. This ionization is detected by a pair of insulated electrodes spaced apart inside the chamber.

Usually one of the electrodes, the cathode, is the inner surface of a cylindrical metallic shell forming part of the chamber. The anode extends coaxially within the shell and is supported by two insulating spacers which are sealed to the shell completing the chamber. The chamber is evacuated and then pressured with a gaseous ionizing medium, usually a mixture of an inert gas such as argon, neon or crypton together with a halogen for quenching purposes. An electric field is then normally impressed between the anode and the cathode to produce an avalanche effect when ionization is triggered by incoming radiation. This produces an electrically perceptible count when the ions reach the anode and the count rate indicates the intensity of the radiation.

In combination with these known features, this invention employs a new structure and assembly technique to provide a greatly improved and very useful detector of minute dimensions. Detectors embodying this invention have been made as small as 6 mm. long and 1 mm. in diameter at reasonable costs, without sacrificing significant accuracy of radiation detection.

These micro-miniature detectors have already found significant use in medical radiological applications. In one such application the entire detector with its attached electrical leads have been placed inside a hypodermic needle and inserted into a specific and precise area of a patient's body for on the spot monitoring of radiation. The size and configuration of these detectors make them extremely useful in isotope tracer applications and also in various types of cancer arresting radiation treatments. More new and useful applications for these miniature, highly responsive detectors, exist wherever accurate radiation monitoring is required in space-limited surroundings.

These detectors have also been used very successfully in applications where high intensity gamma radiation must be measured. Due to the close proximity between the two electrodes which can be achieved in detectors of ths type the dead time between pulses is minimized. As a result, intensities as high as 1000 R./hr. have been measured, where distinct pulses approximating 35,000 counts per second were obtained.

Detectors embodying the present invention have an anode made of a small perforated metal tube or a bored anode wire. This anode is mounted concentrically in the detector shell usually on a pair of insulating spacers and is sealed to the shell to define the gas-tight ionization chamber. The shell is electrically conductive and radiation-permeable, and its interior surface serves as the cathode. The open end of the anode passes through its adjacent supporting spacer to an anode perforation within the chamber to provide a chamber evacuating and pressuring connection, the gas passing through the open end and perforation of the anode into the chamber. The other end of the anode is sealed in and to a supporting end seal. When the chamber has been filled with the desired content of ionizing gas, this anode open end is sealed to complete the closure of the chamber. Sheathed, insulated electrical leads are connected to the anode and cathode which terminate in a suitable electrical connector, which can then be plugged into the radiation reading or counting device. This connector preferably has the same diameter as the detector itself thus permitting the entire unit to be inserted into a patient's body by a hypodermic needle as described above. Equally important in this invention is the method of constructing the detector. Fabricating accurate detectors of such minute size presents a formidable problem. Reproducible accuracy requires concentric positioning of the anode in the shell. Concentricity is achieved in my invention by first forming oversized beads of ceramic insulating material on the anode at the spacer locations. This beaded anode can then be handled as a unit, and the beads ground down conveniently to permit accurate positioning of the anode inside the cathode. Machining of the spacers also accurately controls the chamber volume which further enhances the accuracy of the detector. Moreover, this assembly technique coupled with the earlier described chamber pressuring arrangement makes maximum use of overall dimensions available to yield the greatest effective detecting surface, and thereby the highest accuracy per unit volume for a minaturized detector.

The high intensity detectors discussed above can be made in the same way. If, however, external dimensions are not limited in these high range detectors, it may be advantageous to enclose the anode and cathode structure in a glass envelope to make the counter less sensitive to gas absorptions. This glass envelope technique also reduces the cost of the counter, since instead of boring and perforating the anode as described earlier, the cathode can be perforated and the ionizing gas enclosed within the glass envelope. The gas will then flow into the inner volume between the anode and the cathode through the perforation in the cathode.

The primary object of this invention therefore, is to provide a miniature radiation detector capable of highly accurate radiation monitoring yet occupying a minimal amount of space.

A further object of this invention is to provide a practical method of assembling a miniature, highly accurate radiation detector.

A further object of this invention is to provide a radiation detector capable of accurately measuring high intensity radiation.

Another object of this invention is to provide a practical method of assembling a radiation detector capable of measuring high intensity radiation.

A still further object of this invention is to provide a novel chamber evacuating and pressuring arrangement, especially suitable for miniature detectors.

Other objects and advantages of this invention will become apparent from consideration of the following detailed description of the preferred form of the invention, taken in conjunction with the appended drawing in which:

FIGURE 1 is a longitudinal section through the detector; and

FIGURE 2 is a section taken through the detector along lines 2—2 of FIGURE 1.

FIGURES 1 and 2 illustrate a preferred embodiment of a detector fabricated according to the present invention. The detector comprises ionization chamber 11 extending between a conductive anode 12 and an electrically conductive cylindrical shell 13, the inner surface of which serves as the cathode. Anode 12 is supported coaxially within cathode 13 by spacers 14 and 16.

Ionization chamber 11 is completed by end seal 15 extending between anode 12 and shell 13 at one end, and end seal 17 closing off both the other end of cathode 13 and the bore of anode 12. Spacers 14 and 16 and seals 15 and 17 are of an electrically insulating material.

Anode 12 may be tubular or longitudinally bored at one end so as to be in free communication with perforation 18 for evacuating and filling chamber 11 with an ionizing gas medium. The filler gas enters and leaves through the outwardly extending end of anode 12 in a manner described below. Seal 20 closes the outwardly extending end of anode 12 thereby making chamber 11 gas-tight.

Insulated anode connection 21 and insulated cathode connection 22 lead out from the inside surface of shell 13 a suitable distance for a conveniently adapted ultimate electrical terminal (not shown). A plastic insulating sheath 23, which encloses connections 21 and 22, is attached to the inside surface of shell 13. The lower end of sheath 23 is slit a suitable length to fit around and cover the joint of cathode connection 22 to shell 13.

In assembling a detector of this type anode 12 may be conveniently cut to the desired length of tube or wire made of a conductive material resistant to the corrosive influence of the ionizing gas and heat resistant to usual medical sterilization temperatures such as stainless steel.

If wire is used, it is bored longitudinally at least down to the point corresponding to perforation 18. The diameter should be small enough to yield a sufficiently large chamber 11, yet not so small as to restrict evacuation and filling of chamber 11. Anode 12 may then be drilled or punched to form perforation 18.

Beads of ceramic insulator material may then be fused on anode 12 at spacer locations 14 and 16. These beads are initially oversized and then machined, such as by grinding, to the size of spacers 14 and 16 so as to fit snugly inside the shell 13, thereby permitting easy sealing. Forming spacers 14 and 16 in this manner is an important aspect of my invention. By concentrically grinding the spacers 14 and 16 on anode 12 as a unit, the outer surfaces of spacers 14 and 16 are made closely concentric with respect to the metal anode 12. The ceramic spacer is sealed to metal shell 13 by a glass seal 17, for which purpose Corning 7510 is preferably used, the glass wetting the ceramic and dissolving into the oxide layer of the metal on being fired. In like manner, seal 15 is formed to seal the abutting surfaces between spacer 14 and shell 13. Seal 15 also fuses to both shell 13 and anode 12. The melting points of seals 15 and 17 and spacers 14 and 16 must be higher than medical sterilization temperatures.

The detector chamber 11 may then be evacuated and pressured with the desired filler gas through perforation 18, gas passing through the open end of anode 12 (before that end is crimped, as shown in FIGURE 1). As pointed out earlier, this gas may be any of a class of mixtures including compositions of inert gases mixed with halogens for quenching effects. Argon and neon halogen admixtures have been found suitable for this purpose. One sequence of pressuring includes evacuating, purging, evacuating and filling in that order. Immediately following the final filling step anode 12 is closed by hermetic seal 20, for example by a cold crimp seal as shown.

Either following or prior to the charging of chamber 11, anode connection 21 and cathode connection 22 may be attached to shell 13. Connections 21 and 22 are preferably made of a strong, highly conductive, insulated wire, such as a Teflon-covered nickel wire, which can be attached to shell 13 by welding. Other materials which may withstand common medical sterilizing procedures may be used.

Cathode and anode connections 21 and 22 may then be enclosed by protective sheath 23, formed of a flexible tough material such as a silicon rubber, one suitable form being sold under the trade name Silastic. Polyvinylchloride and Teflon are also suitable materials for this use. Sheath 23 is cemented to the inner surface of shell 13 by a suitable cement such as a Kodak plastic-to-metal cement, sheath 23 being slit at its end for a length sufficient to accommodate the attachment of cathode connection 22 to shell 13.

The particular detector herein described in detail has been found extremely useful in medical applications where it is inserted into the patient's body by means of a hypodermic needle. The needle is first inserted at the precise point where radiation monitoring is desired. The detector, including the attached cathode and anode connections 21 and 22 enclosed in protective sheath 23, is then inserted into the patient's body by passing it through the hollow center of the hypodermic needle and then withdrawing the needle from around the detector, leaving the detector in the patient's body. The cathode and anode connections 21 and 22 enclosed in the protective sheath 23 extend from the detector shell 13 to and through the surface of the patient's skin to a convenient terminal which may be connected to a suitable count recorder or rate meter as the particular application requires. The rounded surface of joint 17 and flush attachment of sheath 23 to the inner surface of shell 13 contributes to the ease of insertion and withdrawal of the detector from the patient's body.

Detectors fabricated in this manner are also extremely useful in high intensity radiation monitoring applications. Since the assembly technique disclosed herein permits accurate positioning of anode 12 within cathode 13 in very close proximity with each other, the dead time between successive pulses of the detector can be minimized. This gives an increased range of radiation measurement without decreasing the sensitivity of the detector. As pointed out earlier, where size limitations are not critical in these high intensity radiation applications, the entire detector can be enclosed in a glass or other radiation permeable, gastight envelope. The envelope serves to prevent absorption or loss of gas, and also to reduce manufacturing costs. Costs are reduced since cathode 13 instead of the anode 12 can be perforated for admitting gas to chamber 11. This permits the use of a conventional wire type construction for anode 12. Chamber 11 is charged with an ionizing gas through a suitable opening in the glass envelope which is then sealed.

It is apparent that this detector is readily adaptable to other current uses, and that new applications will be found in the future. Variations and modifications may be required to suit the particular end use desired. For instance, chamber 11 may be defined by a variety of gas-tight envelopes, such as an integral closed-end shell 13 and one seal 15. Anode 12 may be supported by only one support, in this example, by the support opposite the end cover which is integal with shell 13. Furthermore, anode supports need not serve as chamber end walls but may be members separate and distinct from them, and electrodes may be disposed in the ionization chamber in configurations differing from those illustrated. Therefore it should be understood that althuogh a single specific embodiment has been described, the above description is not to be construed in a limiting sense and the scope of the invention is defined solely by the appended claims.

What is claimed is:

1. The method of making a radiation detector sub assembly including an electrode of finite length and having a cylindrical outer surface, intended to be fixedly positioned coaxially in the detector shell, comprising the steps of fusing substantially cylindrical rigid insulating material to said electrode at a plurality of positions to form spacers, said insulating material having a diameter extending beyond the inner surface of said shell if said electrode were positioned therein, and removing the portion of said insulating material which would extend beyond said shell inner surface to provide concentric abutting surfaces between said rigid insulating material and said shell when said electrode is positioned therein.

2. The method of claim 1 wherein said electrode has a longitudinal bore, further comprising the step of perforating the surface of said electrode to said bore at a point intermediate said insulating spacers.

3. The method of making a radiation detector including a hollow electrode of finite length having a cylindrical outer surface and an outer detector shell larger in outside diameter than the outer diameter of said electrode comprising the steps of fusing substantially rigid fusible insulating material to said electrode at a plurality of locations to form spacers, said insulating material having a diameter extending beyond the inner surface of said shell if said electrode were positioned therein, removing the portion of said insulating material which would extend beyond said shell inner surface to provide abutting surfaces between said rigid insulating material and said shell, perforating the surface of said electrode to said bore intermediate said rigid insulating material, inserting said electrode assembly coaxially into said shell, supplying said assembly with a gaseous ionizing medium and sealing said radiation detector assembly.

4. The method of claim 3 wherein the steps of supplying said assembly with a gaseous ionizing medium and sealing said detector assembly comprises the steps of sealing said shell to form a gas-tight enclosure with said electrode with said electrode bore communicating with the exterior of said enclosure, supplying said enclosure with a gaseous ionizing medium through said bore and sealing said bore.

5. The method of manufacturing a radiation detector as claimed in claim 4 wherein said step of sealing said shell to form said gastight enclosure with said electrode comprises the steps of placing a second fusible material having a lower melting point than said first substantially rigid fusible insulating material, said electrode and said shell, adjacent the rigid insulating material, the shell and the electrode, heating said second fusible material to fuse said material and cooling said material.

6. The method of manufacturing a radiation detector as claimed in claim 3 wherein the steps of supplying said assembly with a gaseous ionizing medium and sealing said detector assembly comprises the steps of enclosing said electrode and said shell in gastight radiation permeable envelope open at one end, supplying said envelope with a gaseous ionizing medium through said opening and sealing said opening.

No references cited.

RICHARD H. EANES, Jr., *Primary Examiner.*